(12) United States Patent
Miyajima

(10) Patent No.: US 11,413,880 B2
(45) Date of Patent: Aug. 16, 2022

(54) EDITING DEVICE EDITING FIRST PRINT DATA AND SECOND PRINT DATA RESPECTIVELY FOR FIRST TAPE AND SECOND TAPE TO BE BONDED TO THE FIRST TAPE

(71) Applicant: BROTHER KOGYO KABUSHIKI KAISHA, Nagoya (JP)

(72) Inventor: Yusuke Miyajima, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/157,988

(22) Filed: Jan. 25, 2021

(65) Prior Publication Data
US 2021/0229465 A1 Jul. 29, 2021

(30) Foreign Application Priority Data
Jan. 27, 2020 (JP) .............................. JP2020-011140

(51) Int. Cl.
| | | |
|---|---|---|
| G06F 3/12 | (2006.01) | |
| B41J 3/407 | (2006.01) | |
| G06K 15/00 | (2006.01) | |
| H04N 1/387 | (2006.01) | |

(52) U.S. Cl.
CPC ............ B41J 3/4075 (2013.01); G06F 3/122 (2013.01); G06F 3/1242 (2013.01); G06K 15/4065 (2013.01); H04N 1/387 (2013.01)

(58) Field of Classification Search
None
See application file for complete search history.

(56) References Cited

U.S. PATENT DOCUMENTS

| | | | | |
|---|---|---|---|---|
| 8,614,801 | B2* | 12/2013 | Maeda | H04N 1/00639 |
| | | | | 358/1.18 |
| 2009/0103123 | A1* | 4/2009 | Ikedo | B41J 3/46 |
| | | | | 358/1.12 |
| 2013/0078024 | A1* | 3/2013 | Handa | B41J 11/42 |
| | | | | 400/621 |
| 2016/0009105 | A1* | 1/2016 | Yamada | G06F 3/1206 |
| | | | | 347/5 |

(Continued)

FOREIGN PATENT DOCUMENTS

| | | | |
|---|---|---|---|
| JP | H07-093448 A | 4/1995 | |
| JP | H08-016581 A | 1/1996 | |

(Continued)

*Primary Examiner* — Haris Sabah
(74) *Attorney, Agent, or Firm* — Kenealy Vaidya LLP

(57) ABSTRACT

In an editing device, a controller edits first print data based on first information. The first print data represents a first image in a printing area. The first image is to be printed on a first tape. The controller executes edits second print data based on second information. The second print data represents a second image in the printing area. The second image is to be printed on a second tape to be bonded to the first tape. The controller sets a prohibited area in the printing area in a case that a specific object is added to the first image. The prohibited area is for prohibiting an object different from the specific object from being arranged therein. The controller nullifies editing based on the second information in a case that that an object different from the specific object is arranged in the prohibiting area.

16 Claims, 11 Drawing Sheets

(56) References Cited

U.S. PATENT DOCUMENTS

| | | | |
|---|---|---|---|
| 2016/0059591 A1* | 3/2016 | Tsuchida | B41J 11/703 347/104 |
| 2016/0221363 A1* | 8/2016 | Bae | B41J 3/4075 |
| 2018/0273230 A1* | 9/2018 | Hasegawa | B41J 11/663 |
| 2019/0212955 A1* | 7/2019 | Gutierrez | G06F 3/125 |

FOREIGN PATENT DOCUMENTS

| | | |
|---|---|---|
| JP | H08-167040 A | 6/1996 |
| JP | 2010-017937 A | 1/2010 |

* cited by examiner

EDITING DEVICE EDITING FIRST PRINT DATA AND SECOND PRINT DATA RESPECTIVELY FOR FIRST TAPE AND SECOND TAPE TO BE BONDED TO THE FIRST TAPE

CROSS REFERENCE TO RELATED APPLICATION

This application claims priority from Japanese Patent Application No, 2020-011140 filed Jan. 27, 2020. The entire content of the priority application is incorporated herein by reference.

TECHNICAL FIELD

The present disclosure relates to an editing device and a method for editing.

BACKGROUND

An editing device for editing print data is well known in the art. The editing device includes a display. When creating a single label by sequentially overlaying each of a plurality of printed tapes, the editing device can display an image representing the label on the display based on print data for printing each of individual tapes constituting the label.

SUMMARY

However, since the conventional editing device is used to edit individual printing tapes corresponding to each of the plurality of tapes configuring the label, the device cannot be used to edit the layout of objects printed on one tape in consideration of the layout of objects printed on other tapes. Consequently, when a label is created using print data edited on the conventional editing device, an object printed on one tape may inadvertently overlap an object printed on another tape.

In view of the foregoing, it is an object of the present disclosure to provide an editing device and a method for editing print data used to print continuous strips of tape that is capable of considering the arrangement of an object printed on one tape in relation to the arrangement of objects printed on other tapes among a plurality of tapes constituting a label.

In order to attain the above and other objects, the disclosure provides an editing device. The editing device includes a controller and a storage. The storage stores a program that, when executed by the controller, causes the controller to execute a first editing process to edit first print data based on first information inputted via an input interface, the first print data defining a printing area and representing a first image in the printing area, the first image being to be printed on a first tape, the first tape being a printing medium having a contiguous length; a first display process to display a first screen used for the first editing process on a display, the first screen showing a layout of the first image relative to the printing area; a second editing process to edit second print data based on second information inputted via the input interface, the second print data defining the printing area and representing a second image in the printing area, the second image being to be printed on a second tape, the second tape being a printing medium having a contiguous length and to be bonded to the first tape; a second display process to display a second screen used for the second editing process on the display, the second screen showing layout of the second image relative to the printing area; a settings process to set a prohibited area in the printing area in a case that a specific object is added to the first image in the first editing process, the prohibited area being for prohibiting an object different from the specific object from being arranged therein, the prohibiting area being set according to the specific object; and a nullification process to nullify editing based on the second information executed in the second editing process in a case that that an object different from the specific object is arranged in the prohibiting area in the second editing process.

According to another aspect, the disclosure provides a method. The method includes: a first editing step to edit first print data based on first information inputted via an input interface, the first print data defining a printing area and representing a first image in the printing area, the first image being to be printed on a first tape, the first tape being a printing medium having a contiguous length; a first display step to display a first screen used for the first editing step on a display, the first screen showing a layout of the first image relative to the printing area; a second editing step to edit second print data based on second information inputted via the input interface, the second print data defining the printing area and representing a second image in the printing area, the second image being to be printed on a second tape, the second tape being a printing medium having a contiguous length and to be bonded to the first tape; a second display step to display a second screen used for the second editing step on the display; the second screen showing layout of the second image relative to the printing area; a settings step to set a prohibited area in the printing area in a case that a specific object is added to the first image in the first editing step, the prohibited area being for prohibiting an object different from the specific object from being arranged therein, the prohibiting area being set according to the specific object; and a nullification step to nullify editing based on the second information executed in the second editing step in a case that that an object different from the specific object is arranged in the prohibiting area in the second editing step.

According to another aspect, the disclosure provides a non-transitory computer readable storage medium storing a set of program instructions installed on and executed by a computer for controlling an editing device. The set of program instructions includes: executing a first editing process to edit first print data based on first information inputted via an input interface, the first print data defining a printing area and representing a first image in the printing area, the first image being to be printed on a first tape, the first tape being a printing medium having a contiguous length; executing a first display process to display a first screen used for the first editing process on a display, the first screen showing a layout of the first image relative to the printing area; executing a second editing process to edit second print data based on second information inputted via the input interface, the second print data defining the printing area and representing a second image in the printing area, the second image being to be printed on a second tape, the second tape being a printing medium having a contiguous length and to be bonded to the first tape; executing a second display process to display a second screen used for the second editing process on the display; the second screen showing layout of the second image relative to the printing area; executing a settings process to set a prohibited area in the printing area in a case that a specific object is added to the first image in the first editing process, the prohibited area being for prohibiting an object different from the specific object from being arranged therein, the prohibiting area being set according to the specific object; and executing a nullification process to nullify editing based on the second information executed in the second editing process in a case that that an object different from the specific object is arranged in the prohibiting area in the second editing process.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Next, an embodiment will be described while referring to the accompanying drawings. In the following description, image data for displaying an image will simply be called an image.

Figure 1:
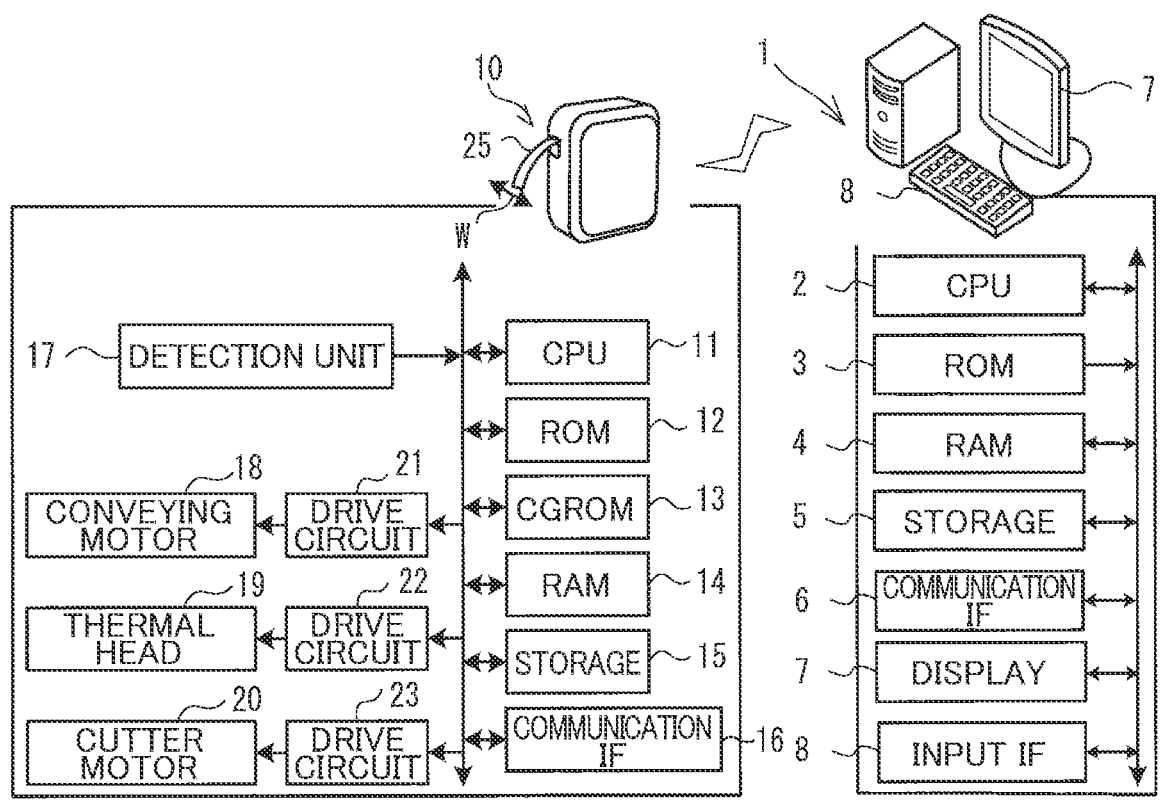
FIG. 1 is a block diagram illustrating an editing device and a printing device according to an embodiment.

As shown in FIG. 1, an editing device 1 is a common personal computer (PC) and is capable of communicating with a printing device 10. The editing device 1 can edit print data for printing a long printing medium, e.g., tape, using the printing device 10.

The editing device 1 is provided with a CPU 2, a ROM 3, a RAM 4, a storage 5, a communication interface 6, a display 7, and an input interface 8. The CPU 2 controls operations of the editing device 1 and is electrically connected to other components of the editing device 1 via an interface circuit (not shown). The ROM 3 stores a boot program and the like. The RAM 4 stores timers, counters, flag data, and temporary data. The storage 5 is configured of flash memory or another storage medium. The storage 5 stores programs for processes executed by the CPU 2. The communication interface 6 is a communication module used to connect to a public network. The display 7 can display images. The display 7 is a liquid crystal display; for example. The input interface 8 enables the user to input information into the CPU 2. The input interface 8 includes a keyboard and a mouse, for example.

The printing device 10 is a thermal-transfer printer that can print characters (alphanumeric characters, symbols, graphics, and other objects) on a long tape. The printing device 10 can print an image on the tape based on print data transmitted from the editing device 1. The printing device 10 is provided with a CPU 11, a ROM 12, a CGROM 13, a RAM 14, a storage 15, and a communication interface 16. The ROM 12, the CGROM 13, the RAM 14, the storage 15, and the communication interface 16 are each electrically connected to the CPU 11.

The ROM 12 stores various programs and the like required for controlling the printing device 10. The CPU 11 performs various computations based on these programs. Printable dot pattern data for printing various characters is stored in the CGROM 13 in association with character code data and is classified by font and size. The RAM 14 is provided with a plurality of storage areas including a text memory and print buffer. The text memory stores data to be printed. The print buffer stores printable dot patterns to be printed. Various arithmetic calculation data and the like are stored in other storage areas of the RAM 14. The communication interface 16 includes a communication module for connecting to public networks.

The printing device 10 is further provided with a detection unit 17, a conveying motor 18, a thermal head 19, a cutter motor 20, and drive circuits 21, 22, and 23. The detection unit 17 and the drive circuits 21-23 are each electrically connected to the CPU 11. The detection unit 17 is a known sensor that detects the type of a tape 25 mounted in the printing device 10 and outputs information indicating this type to the CPU 11. The drive circuit 21 is an electronic circuit for driving the conveying motor 18 to convey the tape 25 along a conveying path. The drive circuit 22 is an electronic circuit for driving the thermal head 19. The drive circuit 23 is an electronic circuit for driving the cutter motor 20 to operate a movable blade (not shown) that cuts off printed tape 25 discharged to the outside of the printing device 10.

Figure 2:
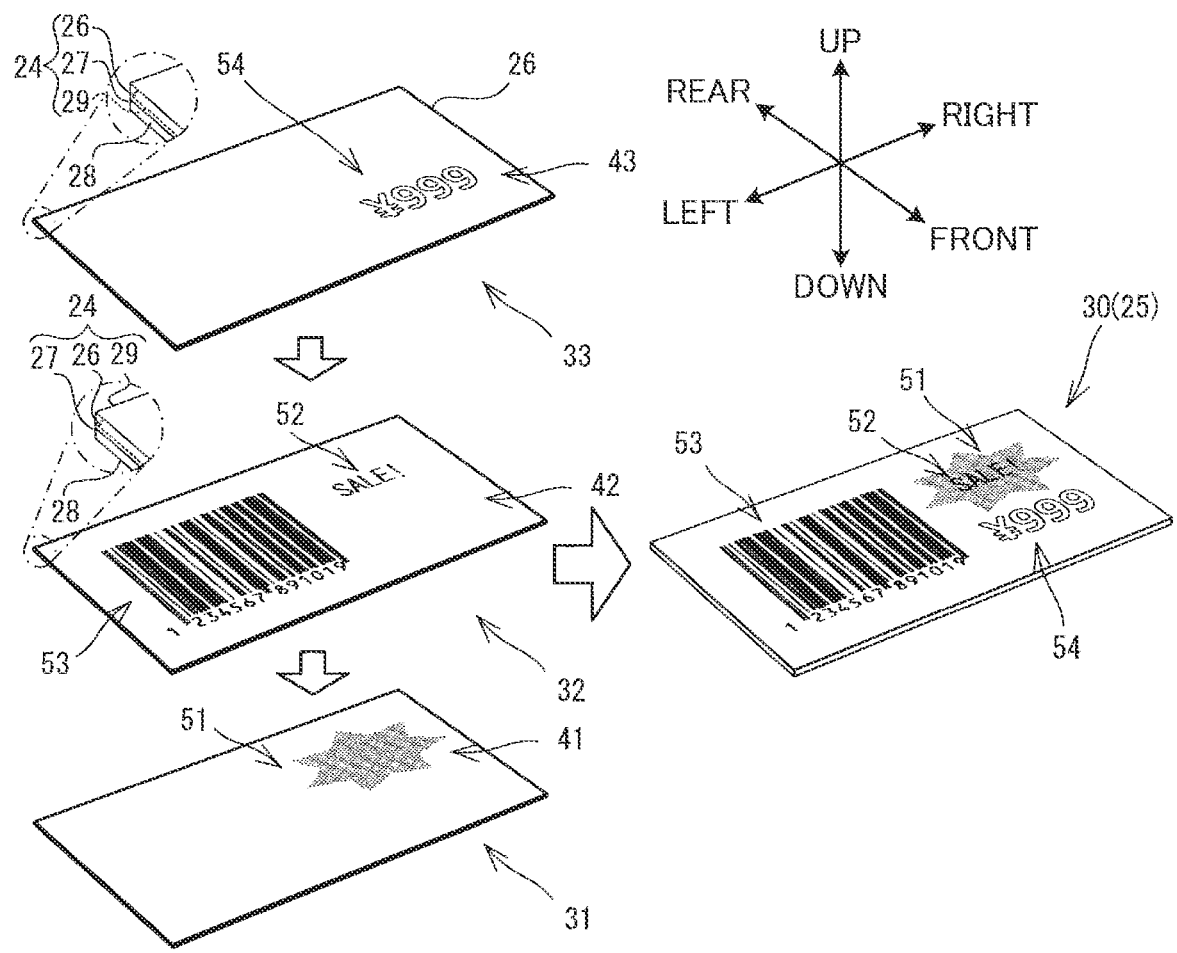
FIG. 2 is an explanatory diagram illustrating a label formed by bonding tapes together.

The tape 25 is a tape-like printing medium having a continuous length. In the embodiment, as shown in FIG. 2, the tape 25 is formed by bonding together three tapes 31-33. Each of the tapes 31-33 includes an adhesive tape 24, and a release paper 28. The adhesive tape 24 has a film tape 26 and an adhesive layer 27. The film tape 26 is formed of a resin material and includes a printing surface 29 as the surface to be printed. The adhesive tape 24 is transparent or translucent. The film tape 26 is an example of the base material sheet. Transparent or translucent in this specification indicates that one side of the adhesive tape 24 is visible from the other side. The adhesive tape 24 may be colored or colorless. The release paper 28 is bonded to the adhesive layer 27. The tapes 31-33 may include a plurality of types, such as a laminate-type and a receptor-type. The laminate tape is formed by bonding a double-sided adhesive tape having the adhesive layer 27 and the release paper 28 to the printing surface 29 of the film tape 26 inside the printing device 10 after the film tape 26 has been printed. With this configuration, the film tape 26 protects the printing surface 29 of the laminate tape 25. A receptor tape is formed by printing on a single-sided adhesive tape configured with the adhesive layer 27 formed only on one surface of the film tape 26. With the receptor tape 25, the printing surface 29 is exposed and not protected by the printed film tape 26. Types of tape may be further classified based on the width W, color, and material of the printing medium, and the printing color.

The editing device 1 can edit print data for a composite label (30). A composite label is created by sequentially overlaying and bonding together a plurality of printed tapes (31-33) having the same size and shape. The tapes (31-33) being overlaid are aligned to maximize the overlapping surface area and are bonded together. Ordinarily; a thermal-transfer printer like the printing device 10 prints only one color at a time determined by the color of the ink ribbon. By printing each of a plurality of tapes (31-33) using ink ribbons of different colors and bonding the plurality of printed tapes together in a prescribed order, the user can obtain the composite label (30) having an image formed in a plurality of colors.

Print data for the composite label (30) includes a plurality of sets of print data (first print data, second print data, and third print data, described later), whereby one set of print data is created for each tape configuring the composite label. Each set of print data specifies the layout of image being printed relative to the printing area. The size and shape of the printing area are identical for each set of print data.

The editing device 1 according to the embodiment can edit objects such as barcode objects, text objects, and graphic objects. A barcode object includes at least one of a linear (one-dimensional) barcode and a matrix (two-dimensional) barcode. A text object includes text. A graphic object includes a graphic other than a barcode.

FIG. 2 shows a sample label 30 is the tape 25 formed by bonding together three tapes 31, 32, and 33 on which images are printed. The tapes 31-33 all have the same size and shape. In the following description, the length dimension, width dimension, and thickness dimension of the tape will respectively correspond to the left-right direction, front-rear direction, and vertical direction in FIG. 2. Further, the direction from the film tape 26 toward the adhesive layer 27 (and the release paper 28) will be considered "downward," and the direction from the adhesive layer 27 (and the release paper 28) toward the film tape 26 will be considered "upward."

The tape 31 is the bottom most tape in the label 30. An image 41 is printed on the tape 31 using an ink ribbon having a first color. The image 41 represents a graphic object 51 having a jagged outline in this example. The tape 32 is disposed on top of the tape 31 and is bonded to the tape 31. An image 42 is printed on the tape 32 using an ink ribbon having a second color, which is different from the first color. The image 42 includes a barcode object 53, and a text object 52, in this example. The tape 33 is the topmost tape in the label 30 and is bonded to the tape 32. An image 43 is printed on the tape 33 using an ink ribbon having a third color, which is different from the first and second colors. The image 43 includes a text object 54 in this example. The graphic object 51 and the text object 52 overlap vertically in the label 30, while the barcode object 53 do not vertically overlap any other objects. In this example, the text object 54 do not vertically overlap any other objects. The barcode object 53 is referred to as the specific object 53, hereinafter.

Next, an overview of an editing process executed on the editing device 1 will be described. The editing device 1 can be used to edit the arrangement of objects to be printed on one tape in consideration of the arrangements of objects to be printed on other tapes when printing a plurality of tapes for creating a label.

Figure 5:
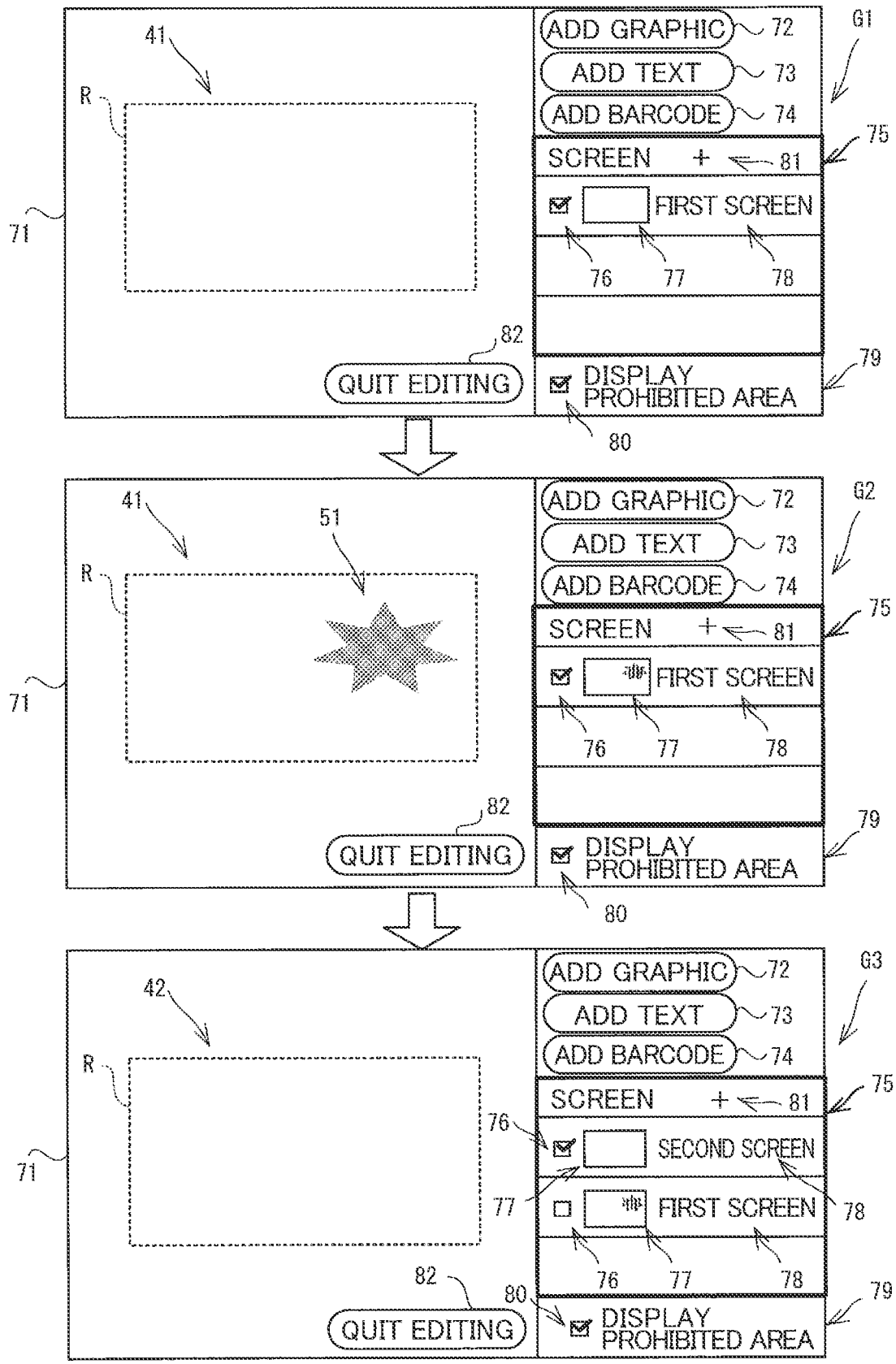
FIG. 5 is an explanatory diagram illustrating screens.

Specifically, the editing device 1 executes a first editing process to edit first print data based on information inputted into the input interface 8 in order to print a first image on a first tape. The editing device 1 performs a first display process to display a first screen on the display 7 for executing the first editing process. The first screen shows the layout of the first image relative to a printing area R (FIG. 5, described later).

The editing device 1 is also used to execute a second editing process to edit second print data based on information inputted into the input interface 8 in order to print a second image on a second tape to be bonded (adhered) to the first tape. The editing device 1 performs a second display process to display a second screen on the display 7 for executing the second editing process. The second screen shows the layout of the second image relative to the printing area R.

The editing device 1 executes a prohibited area setting process when a specific object is added to the first image in the first editing process. The specific object is an object of a specific type. The prohibited area setting process is performed to set a prohibited area P (FIG. 7, described later) within the printing area R based on the layout area of the specific object. Objects other than the specific object are prohibited from being arranged in the area designated as the prohibited area P. Among all editable objects in the embodiment, the editing device 1 classifies barcode objects as specific objects and all other objects as normal objects. In the second editing process, the editing device 1 executes a nullification process to nullify editing based on information inputted into the input interface 8 in a case that an object other than the specific object for which the prohibited area P was set is laid out in the prohibited area P.

Next, an editing process executed by the editing device 1 will be described with reference to FIGS. 2 through 10. In the following example, the editing device 1 will be used to edit print data for creating the label 30 in the example of FIG. 2. The editing device 1 starts the editing process in a case that the user operates the input interface 8 to input a command to edit print data for a composite label. When the command is detected, the CPU 2 of the editing device 1 loads a program stored in the ROM 3 into the RAM 4 and executes the editing process. In the following process, "step" will be abbreviated as "S" in the step numbers.

Figure 3:
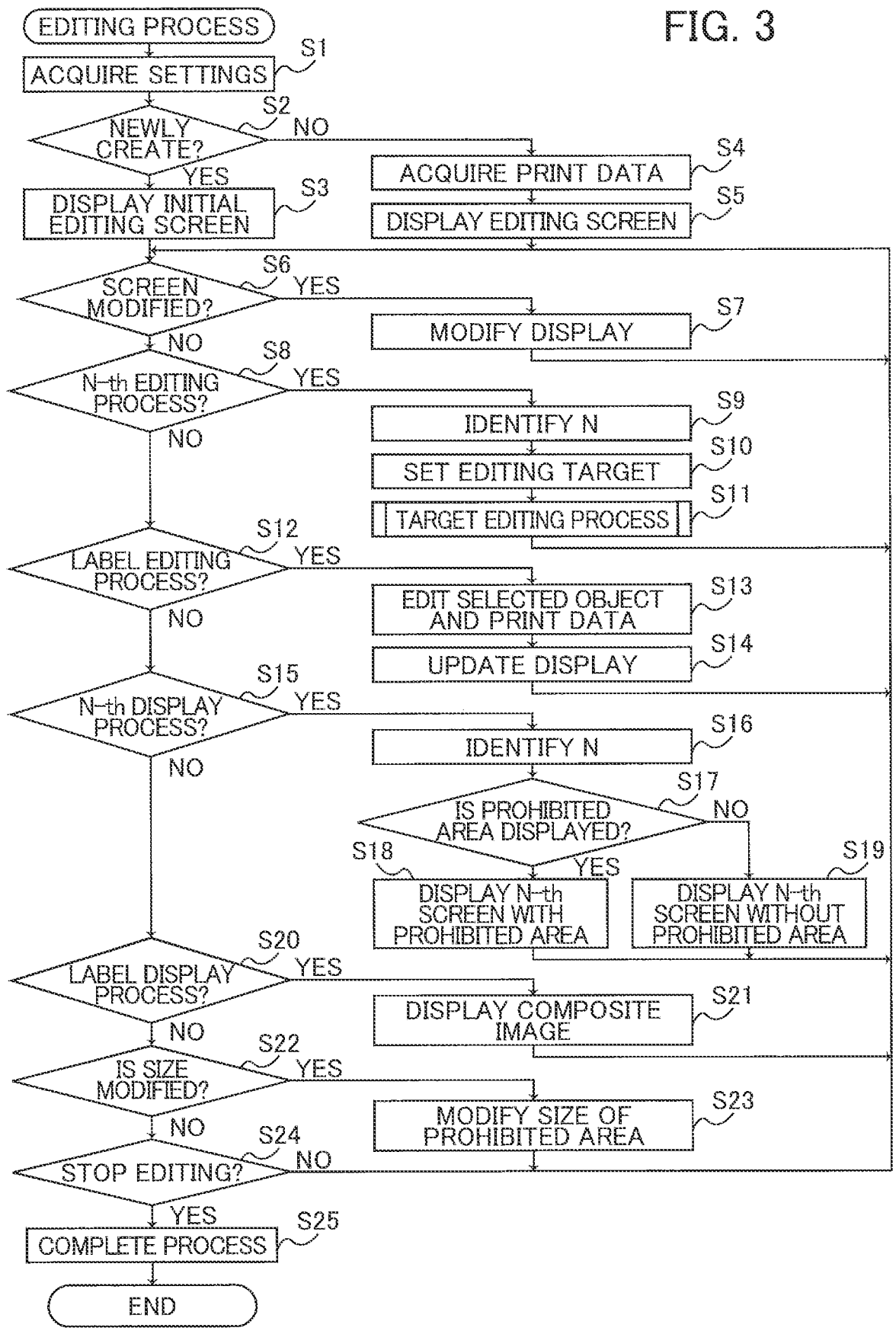
FIG. 3 is a flowchart illustrating an editing process.
Figure 4:
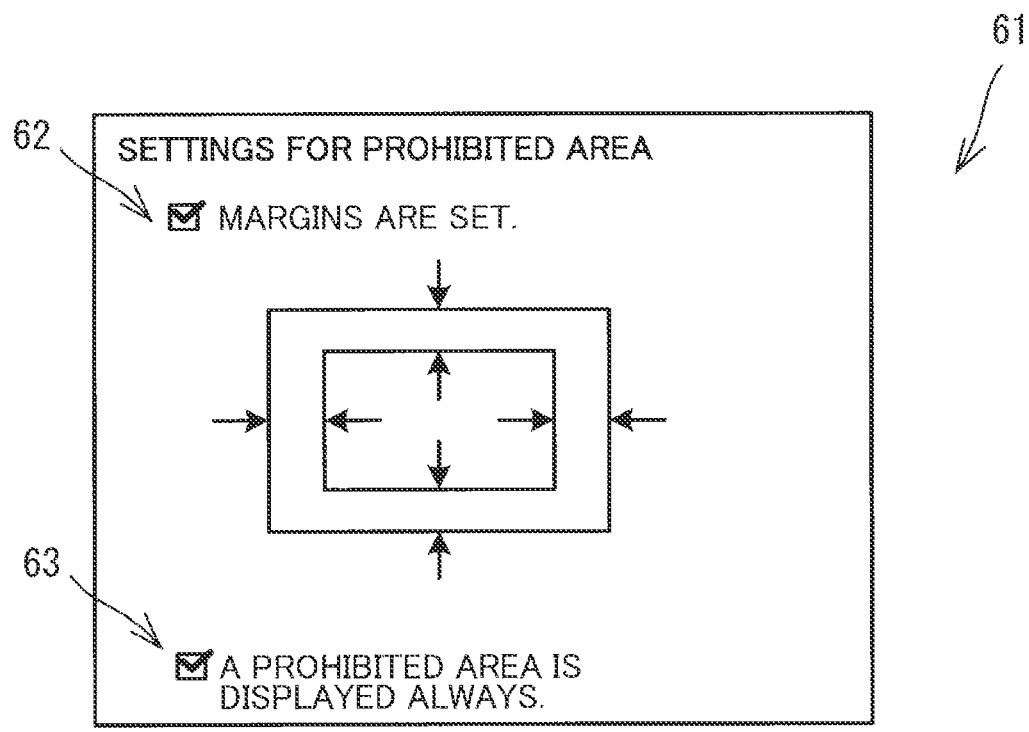
FIG. 4 is an explanatory diagram illustrating a settings screen.

FIG. 3 illustrates steps in the editing process. In S1 of the editing process, the CPU 2 acquires settings related to the process. Setting items for the editing process can be set as needed. For example, the CPU 2 may display a settings screen 61 shown in FIG. 4 on the display 7 and may acquire settings inputted for the editing process. The settings screen 61 includes checkboxes 62 and 63. Setting items in the embodiment include the method of setting the prohibited area P corresponding to the specific object, and an option to display the prohibited area P on the display 7 during the editing process. The method of setting the prohibited area P is determined by an option whether to add margins for setting the prohibited area P. The editing device 1 can set the prohibited area P to be a region that is within the printing area R, corresponds to the specific object, but is further expanded by the specified margins. The prohibited area P is an area in which objects other than the specific object corresponding to the prohibited area P cannot be arranged.

In S1 the editing device 1 acquires information indicating whether the option to set margins was selected based on whether the checkbox 62 was checked. In a case that the option to set margins was selected, the editing device 1 also acquires information indicating the size of the margins. Any suitable method for setting margin size may be used. For example, in a case that the outline of the specific object is rectangular, the size of the top, bottom, left, and right margins around the outline of the specific object may be set individually or uniformly. In S1 the editing device 1 also acquires information indicating whether to display the prohibited area P on the display 7 during the editing process based on whether the checkbox 63 has been checked. Default values for each setting item may be preset and stored in the storage 5.

In S2 the CPU 2 determines whether to create new print data. Here, the user operates the input interface 8 to input instructions indicating whether to create new print data or to read print data from the storage 5 to be edited. In a case that the CPU 2 acquires a command to create new print data (S2: YES), in S3 the CPU 2 displays an initial editing screen G1 shown in FIG. 5 on the display 7, for example.

As shown in FIG. 5, the initial editing screen G1 includes display fields 71, 75, and 79; and buttons 72, 73, 74, 81, and 82. The display field 71 is a space to display an image of the display target in relation to the printing area R. The display target is an N-th screen that includes (or shows) the layout of an N-th image relative to the printing area R for an N-th tape (one of the tapes 31-33 in this example) configuring a label N is an integer from 1 to the total number of tapes configuring the label in the example shown in FIG. 2). Hereinafter, the N-th screen for an N-th tape (the first, second, or third screen in the embodiment) is also referred to as the component screen. In the embodiment, the display of each of the component screens (i.e., for each tape) in the display field 71 can be toggled on and off by checking and unchecking a corresponding checkbox 75. In the screen G1, the display target is an initial component screen, i.e., a first screen, and hence N is 1. Note that the screen number N is indicated by an ID 78 described later.

The dashed line displayed in the display field 71 represents the printing area R. The size of the printing area R may be preset or may be specified by the user. The set printing area R is to be stored in the print data. The editing device 1 enables the user to set the color of the ink ribbon to be used for printing the N-th tape. In this case, objects in the N-th image to be printed on the N-th tape may be displayed in the display field 71 in the specified color.

The user selects the button 72 to input a command to add a graphics object to the printing area R. The user selects the button 73 to input a command to add a text object to the printing area R. The user selects the button 74 to input a command to add a barcode object to the printing area R. Any suitable conventional method may be used for adding each of the objects when selecting the buttons 72-74. The user selects the button 82 to input a command to quit the editing of print data.

The display field 75, which is outlined in a bold line, is a space providing information for each of the component screens in the order in accordance with the overlay order of the corresponding tapes will be overlaid. The display field 75 displays information for the component screens (first, second, and third screens) for the tapes (31, 32, 33) in an ascending order from the bottom of the label toward the top. The order of the vertical arrangement of the information for the component screens in the editing screen G1 represents the overlay order of the tapes corresponding to the component screens. Here, the initial editing screen G1 only includes information for the first screen in the display field 75, but an editing screen G3 (described later) includes information for the first screen and information for the second screen in the display field in the order described above.

The display field 75 further includes an addition button 81 to input an add command to add a new component screen for a tape. In a case that the addition button 81 is selected, information for the new component screen is added to the display field 75.

Information for each of the component screens includes a checkbox 76, a thumbnail 77, and an ID 78. The ID 78 identifies the N-th screen. The checkbox 76 is used to indicate whether an image of the N-th screen identified by the ID 78 should be displayed in the display field 71. In a case that the checkbox 76 is checked, the N-th screen is displayed in the display field 71. The thumbnail 77 displays a reduced image of the N-th screen identified by the ID 78.

The display field 79 includes a checkbox 80 used for indicating whether to display the prohibited area P in the display field 71. When the checkbox 80 is checked, the prohibited area P (or the layout of the prohibited area P) is displayed in the display field 71. Once the prohibited area P is set, the prohibited area P (or the layout of the prohibited area P) is displayed in the display field 71 regardless of the image for the component screen displayed in the display field 71 provided that the checkbox 80 is checked.

Returning to the flowchart in FIG. 3, in a case that the CPU 2 acquires a command to read and edit print data stored in the storage 5 (S2: NO), in S4 the CPU 2 acquires print data from the storage 5 and in S5 displays an editing screen on the display 7 based on the acquired print data. As in the screen G1, the editing screen includes the display fields 71, 75, and 79, and the buttons 72, 73, 74, 81, and 82. In addition, the editing screen includes an image of the display target displayed in the display field 71 based on the acquired print data. Editing screens G2-G15 described later have the same configuration (display fields 71, 75, 79, buttons 72-74, 81, thumbnail 77, and checkboxes 76 and 80).

Following S3 or S5, in S6 the CPU 2 determines whether a screen was modified. Specifically, the user can input a command via the input interface 8, such as the add command to add a component screen for a tape by using the addition button 81, a delete command to delete a component screen for a tape, and an order modification command to modify the order of component screens representing the order in which the corresponding tapes will be overlaid. Any well-known method may be used for inputting the add command, delete command, or order modification command. In a case that the CPU 2 acquires a command to modify a screen (S6: YES), in S7 the CPU 2 executes one of a process to add information (or a thumbnail 77) for a component screen to the display field 75, a process to delete information (or a thumbnail 77) for a component screen from the display field 75, and a process to modify the order in which the component screens are arranged by modifying order of information (thumbnails 77) for component screens. Subsequently, the CPU 2 updates the display in the display field 71 to reflect the modification and returns to S6.

In a case that the CPU 2 determines in S6 that an instruction was not acquired (S6: NO), in 88 the CPU 2 determines whether a command to execute an N-th editing process was detected. A command to execute an N-th editing process is detected in a case that an operation on an object displayed in the display field 71 was detected while only the N-th screen is displayed in the display field 71 or in a case that an operation to add a new object to the display field 71 was detected by one of the buttons 72-74 being selected while only the N-th screen is displayed in the display field 71. Here, only the N-th screen being displayed in the display field 71 indicates that only one checkbox 76 (for the N-th screen) is checked. For example, in a case that the button 72 was selected while the screen G1 is displayed (S8: YES), in S9 the CPU 2 identifies the N of the component screen to be 1 based on information on the checkbox 76, and in S10 sets the first screen as the editing target. Subsequently, the CPU 2 executes a target editing process in S11.

Figure 6:
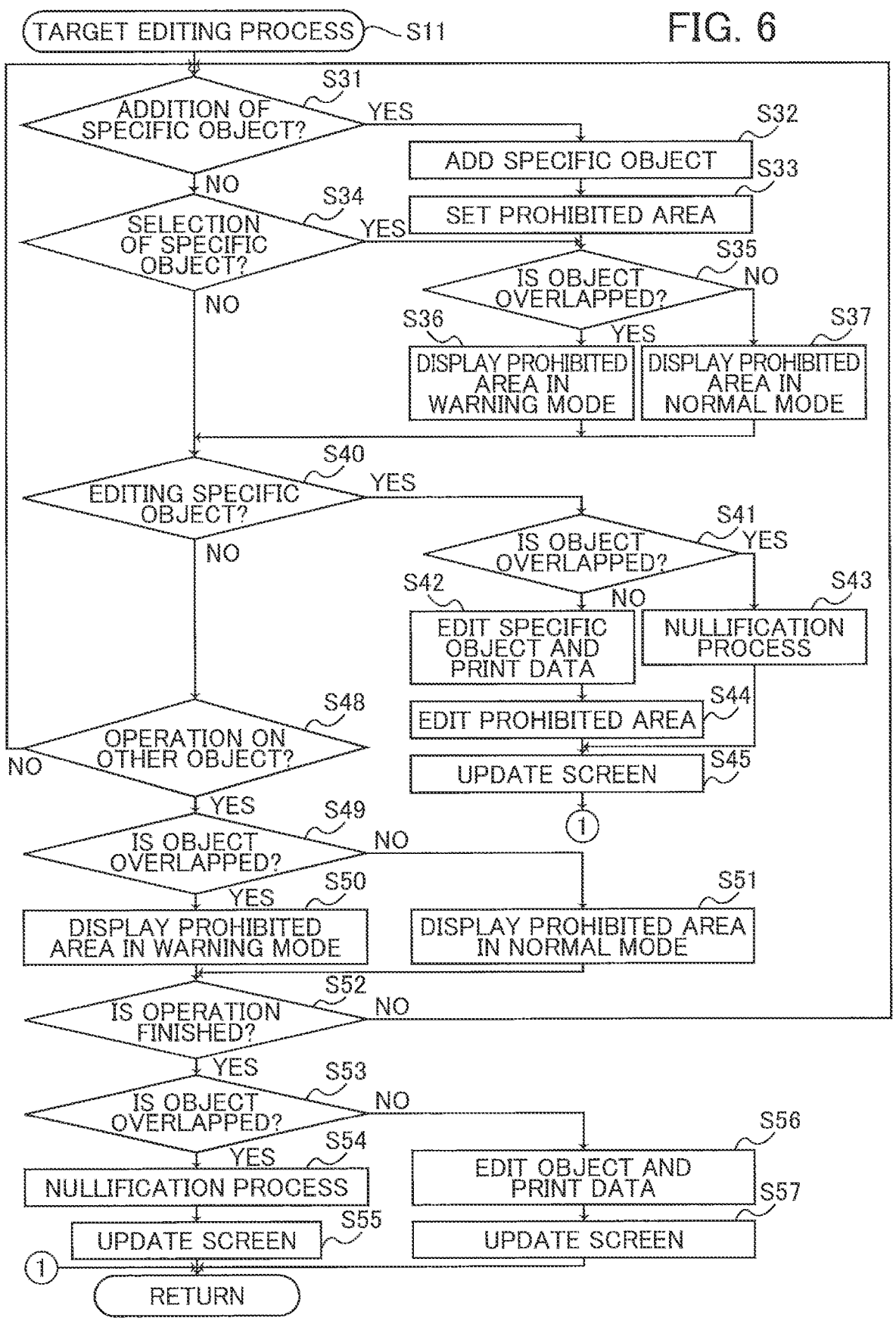
FIG. 6 is a flowchart illustrating a target editing process executed in the editing process shown in FIG. 3.

In the target editing process shown in FIG. 6, the CPU 2 first determines in S31, S34, and S40 whether the user issued a command to add, select, and edit a specific object, and in S48 determines whether user performed an operation on an object other than a specific object. The operation on the object is adding, moving, and modifying the object, for example. These steps will be described later in more detail. In a case that the button 72 was selected in the example shown in FIG. 5, the CPU 2 detects that an operation was performed on a normal object and not a specific object (S31: NO, S34: NO, S40: NO, S48: YES).

In S49 the CPU 2 determines whether the prohibited area P overlaps the object which is other than the specific object and on which the user performed the operation. In a case that YES determination is made in S49, in S50 the CPU 2 displays the prohibited area P in a warning mode. In a case that NO determination is made in S49, in S51 the CPU 2 displays the prohibited area P in a normal mode. In S52 the CPU 2 determines whether the user stops or completes the operation via the input interface 6. In a case that NO determination is made in S52, the CPU 2 returns to the process of S31. Steps S49-52 are described later in detail.

In a case that YES determination is made in S52, in S53 the CPU 2 determines whether the operated object overlaps the prohibited area P. This example will assume that the object being added by the button 72 is the graphic object 51 shown in FIGS. 2 and 5. As shown in the screen G1 of FIG. 5, the prohibited area P has not been set relative to the printing area R and, hence, cannot be overlapped by the normal object being added in this example (S53: NO). Consequently, in S56 the CPU 2 adds the graphic object 51 at the user-specified position according to the command acquired in S52, as shown in FIG. 5, and edits the first print data to be used for printing the tape 31. In S57 the CPU 2 updates the display in the display field 71, as illustrated in the screen G2 shown in FIG. 5 based on the process performed in S56. In the screen G2, the graphic object 51 is displayed in the display field 71 in the first color, which is the color of the ink ribbon used with the tape 31. After completing the target editing process in FIG. 6, the CPU 2 returns to the editing process of FIG. 3. This completes S11 of FIG. 3, and the CPU 2 returns to S6.

On the other hand, in a case that the CPU 2 did not detect a command to execute an N-th editing process (S8: NO), in S12 the CPU 2 determines whether a command to execute a label editing process was detected. A command to execute the label editing process is detected in a case that an operation on an object displayed in the display field 71 is detected while all component screens are displayed in the display field 71 as display targets, or in a case that an operation to add a new object to the display field 71 is detected through the selection of one of the buttons 72-74 while all component screens are displayed in the display field 71 as display targets. Here, each component screen as a display target is a component screen for which the checkbox 76 is checked. In S12 the CPU 2 may make YES determination in a case at least two component screens are displayed in the display field 71. In a case that the CPU 2 detects a command to execute the label editing process (S12: YES), in S13 the CPU 2 edits the selected object among the displayed objects according to the command acquired in S12 and edits the print data according to the results of editing the object. In S14 the CPU 2 updates the display on the display 7 to reflect the editing results in S13. Subsequently, the CPU 2 returns to S6.

On the other hand, in a case that the CPU 2 did not detect an instruction to execute the label editing process (S12: NO), in S15 the CPU 2 determines whether a command to execute an N-th display process was detected. A command to execute an N-th display process is detected in a case that a command to display only the image for the N-th screen and not to display images for other component screens was issued by modifying checks in checkboxes 76 in the display field 75. In a case that a command to execute an N-th display process was not detected (S15: NO), in S20 the CPU 2 determines whether a command was detected to execute a label display process. In a case that a command to display images of all component screens was detected by checks being modified in checkboxes 76 in the display field 75, the CPU 2 determines that the label display process of S21 is to be executed (S20: YES). The CPU 2 may make YES determination in S20 in a case that a command to display images of at least two component screens was detected by check being modified in at least one checkbox 76.

In a case that an instruction to execute the label display process was not detected (S20: NO), in S22 the CPU 2 determines whether an instruction to execute a process for modifying the size of the prohibited area P was detected. In the embodiment, the editing device 1 allows the size of the prohibited area P relative to the specific object to be modified within a range, between the outline of the specific object and the outside of this outline. The user can input a command to modify the size of the prohibited area P by inputting a command to move a control handle displayed on the outline of the prohibited area P. In a case that the CPU 2 does not detect a command to modify the size of the prohibited area P (S22: NO), in S24 the CPU 2 determines whether a quit command to stop editing was detected. The CPU 2 determines that a quit command was detected in a case that a selection of the button 82 was detected. In a case that a quit command was not detected (S24: NO), the CPU 2 returns to S6.

In a case that a command to add a screen was detected while the screen (32 in this example is displayed (S6: YES), in S7 the CPU 2 adds a second screen in a screen modification process, and returns to S6. In a case that the CPU 2 subsequently detects a command to remove a check from the checkbox 76 for the first screen after the second screen was added (S15: YES), in S16 the CPU 2 identifies that N is 2 for the second screen, and in S17 determines whether a setting was made to display the prohibited area P. In the screen G2 of the example shown in FIG. 5, the checkbox 80 is checked, and thus the CPU 2 determines that a setting was made to display the prohibited area P (S17: YES). In S18 the CPU 2 displays a screen (33 that includes only the image 42 in the display field 71, as illustrated in FIG. 5. Though the setting to display the prohibited area P is made at this time, no specific object is included in the image 42. Thus, the image 42 does not show the layout of the prohibited area P. In a case that the specific object is included in a component screen and the setting to display the prohibited area P is made, in 818 the CPU 2 displays the N-th screen which shows the layout of the prohibited area P. Subsequently, the CPU 2 returns to S6.

In a case that a command to select the button 74 was detected while the screen G3 is displayed (S6: NO, S8: YES), in 89 the CPU 2 identifies the N to be 2, in S10 sets the editing target to the second image, and in S11 executes the target editing process. In S31 of FIG. 6, the CPU 2 determines that a command to add the specific object 53 was detected (S31: YES) and in S32 displays the specific object 53 in the display field 71 in a selected state, as shown in the screen (14 in FIG. 7. In the screen G4, the specific object 53 is displayed in the display field 71 in the second color, which is the color of the ink ribbon used with the tape 32. In a case that an object is selected, the CPU 2 treats the object in its original pre-edited state and displays an arrow cursor Q the selected object. That is, in the case that the object is selected, the CPU 2 provisionally decide to edit the selected object but not completely decide to edit the selected object, and treats the selected object which can be restored to the original state.

In S33 the CPU 2 sets the prohibited area P in the printing area R based on the area in which the specific object is laid out. The prohibited area P is the area in which objects other than the specific object are prohibited from begin arranged. The CPU 2 may set the prohibited area P to a region in the printing area R expanded from the region in which the specific object is laid out by the margins specified in the settings acquired in S1. The prohibited area P is set relative to the printing area R for each component screen. Thus, the position of the prohibited area P relative to the printing area R is the same for each component screen.

In S35 the CPU 2 determines whether the prohibited area P set in S33 is overlapped by other objects. "Other objects" are all objects other than the specific object corresponding to the prohibited area P set in S33. In a case that a plurality of specific objects has been laid out, other objects include those specific objects other than the selected specific object. In a case that the prohibited area P is not overlapped by other objects (S35: NO), in S37 the CPU 2 displays the prohibited area P in a normal mode. In a case that the prohibited area P is overlapped by another object (S35: YES), in S36 the CPU 2 displays the prohibited area P in a warning mode that differs from the normal mode. In a case that the prohibited area P is displayed in the normal mode in the embodiment, the CPU 2 displays the outline of the prohibited area P in a normal color (blue, for example) and fills the area inside the outline of the prohibited area P in the normal color (indicated by cross-hatching).

Figure 7:
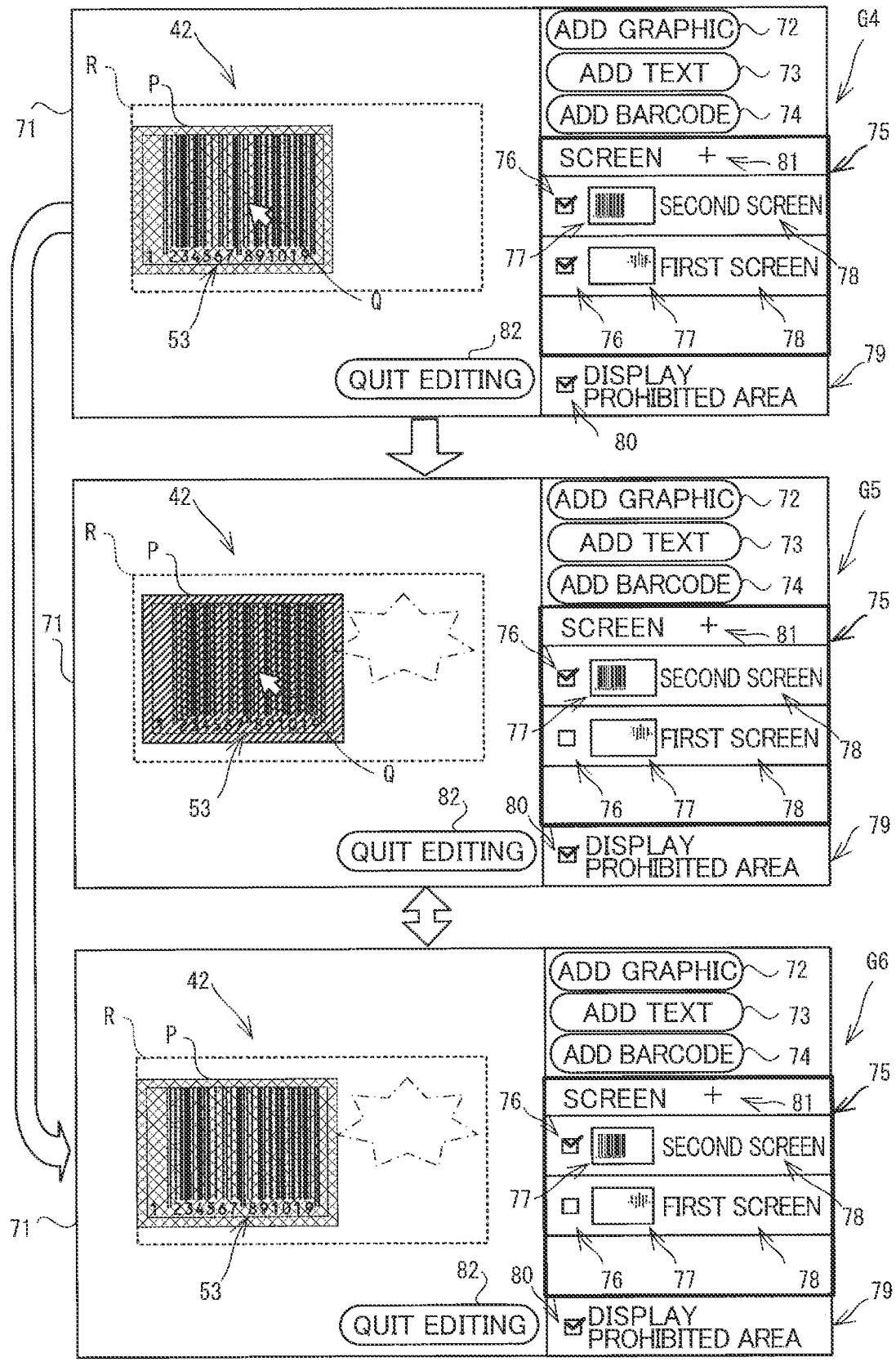
FIG. 7 is an explanatory diagram illustrating screens.
Figure 8:
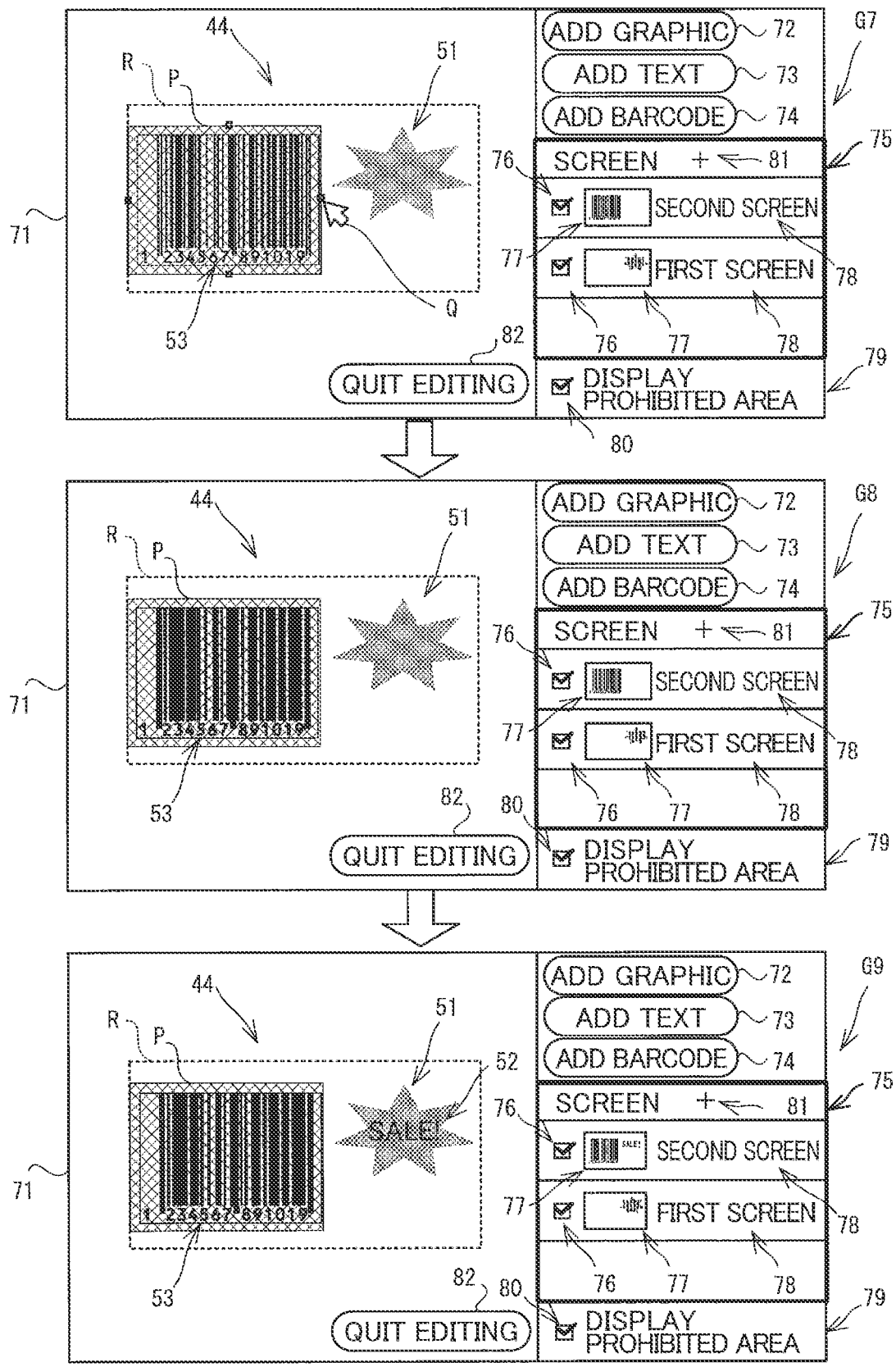
FIG. 8 is an explanatory diagram illustrating screens.

Here, in a case that the layout of the selected specific object 53 is modified so that the specific object 53 (the prohibited area P) overlaps another object such as the graphic object 51, as illustrated in a screen G5 in FIG. 7 (S34: YES, S35: YES), in S36 the CPU 2 displays the prohibited area P in the warning mode, i.e., in a different format from the normal mode. Specifically, to display the prohibited area P in the warning mode in the embodiment, the CPU 2 displays the outline of the prohibited area P in a warning color (red, for example) that differs from the normal color and fills the region inside the outline of the prohibited area P with the warning color (depicted with diagonal hatching in FIG. 7), as illustrated in the screen (35.

In S41 the CPU 2 determines whether the edited specific object overlaps other objects.

In a case that the operation of selecting the specific object 53 newly added in S32 is canceled in this state of the warning mode shown in the screen G5, i.e., in a case that the specific object 53 is deselected in the state shown in the screen G5 (S40: YES, S41: YES), in S43 the CPU 2 performs a nullification process to nullify the command to add the specific object 53. In S45 the CPU 2 displays the screen G3 that was displayed before the command to add the specific object 53 was inputted.

On the other hand, in a case that the user notices that the prohibited area P is displayed in the warning mode while referencing the display field 71, operates the input interface 8 in order to move the specific object 53 to a position in which the prohibited area P becomes displayed in the normal mode (a position where the specific object 53 does not overlap other objects), as illustrated in a screen G6 in FIG. 7, and subsequently deselects the specific object 53, in S40 the CPU 2 detects that an operation to cancel the selection of the object was performed while the prohibited area P is displayed in the normal mode (S40: YES), determines that the specific object 5 does not overlap other objects (S41: NO), and in S42 adds the specific object 53 to the specified position and edits the second print data used for printing on the tape 32 based on the operations by the user. In S44 the CPU 2 edits the prohibited area P by modifying the layout of the prohibited area P relative to the printing area R according to the specified position. In S45 the CPU 2 updates the display field 71 displayed in the display 7 according to the editing results from S42 and S44. Subsequently, the CPU 2 ends the target editing process and returns to the editing process of FIG. 3.

In a case that the CPU 2 detects that the specific object 53 is once again selected from its state displayed in the screen G6 and is subsequently deselected in the position shown in the screen G5 where the specific object 53 overlaps object 51 (S34: YES, S35: YES, S36, S40: YES, S41: YES), in S43 the CPU 2 nullifies the command to move the specific object 53 in the nullification process in S45 the CPU 2 redisplays the screen G6 on the display 7, which was the screen displayed before the user last inputted a command to move the specific object 53.

Here, in a case that the CPU 2 detects a command to input a check into the checkbox 76 for the first screen while the screen G6 is displayed (S20: YES), in S21 the CPU 2 displays a composite image 44 in the display field 71, as shown in a screen G7 of FIG. 8. The composite image 44 includes the images 41 and 42 overlapped in their overlay order in accordance with the overlay order of the corresponding tapes 31 and 32. Subsequently, the CPU 2 returns to S6.

In a case that the CPU 2 detects a command to select the prohibited area P and to modify the size of the prohibited area P while the screen G7 is displayed (S22: YES), in S23 the CPU 2 modifies the size of the prohibited area P under a prescribed condition according to the detected command. The prescribed condition for S23 includes a condition that the modified prohibited area P does not overlap another object and a condition that the outline of the modified prohibited area P is not inside the outline of the specific object but is within a range between the outline of the specific object and the outside of this outline. To modify the size of the prohibited area P, the user can input a command to move the control handle displayed on the outline of the prohibited area. P through operations on the input interface 8. In S23 the CPU 2 updates the display on the display 7 according to the change made to the size of the prohibited area P in a case that the prescribed condition for S23 is satisfied, as shown in a screen G8, and subsequently returns to S6. In a case that the prescribed condition for S23 is not satisfied, the CPU 2 does not change the size of the prohibited area P.

In a case that the CPU 2 detects a command to select the button 73 while the screen G8 is displayed (S6: NO. S8: NO, S12: YES), in S13 the CPU 2 edits the selected object under a prescribed condition. The prescribed condition for S13 includes a condition that the selected object does not overlap the prohibited area P when the selected object is edited and a condition that the selected object is added to the topmost component screen (the second screen in this example). In a case that the user performs a command to add the text object 52 to the image 42 of the second screen while the prescribed condition for 13 is satisfied, in S13 the CPU 2 edits the second print data based on the user's operation, and in S14 displays a screen G9 on the display 7. In the screen G9, the text object 52 as the selected object is displayed in the display field 71 in the second color. Here, the text object 52 is included in the second screen. In a case that the prescribed condition for S13 is not satisfied, the CPU 2 does not edit the print data for the component screen (the second print data in this example). Subsequently, the CPU 2 returns to S6.

In a case that the CPU 2 detects commands to add a third screen in a state that the screen G9 is currently displayed (S6: YES), in S7 the CPU 2 adds a third screen in the screen modification process. Thereafter, in a case that the CPU 2 detects that command to execute an N-th display process was detected (that is, the checkboxes 76 for the first and second screen are unchecked) (S15: YES), in S16 the CPU 2 identifies that N is 3. Subsequently, in a case that the CPU 2 detects commands to hide the display of the prohibited area P (the checkbox 80 was unchecked) (S16, S17: NO), in S19 the CPU 2 performs a process to display the third screen as shown in the display screen G10 that includes the image 43 of the third screen on the display 7 but does not include the prohibited area P. That is, in S19 the CPU 2 displays the N-th screen without displaying the layout of the prohibited area P regardless of whether the specific object is added to a component screen. Subsequently, the CPU 2 returns to S6.

In a case that the CPU 2 subsequently detects a command to select the button 73 while the screen G10 is displayed (S6: NO, S8: YES), in S9 the CPU 2 identifies N to be 3, in S10 sets the editing target to the image 43, and in S11 executes the target editing process. In this example, the CPU 2 determines that a command was detected to acid the text object 54 (S31: NO, S34: NO, S40: NO, S48: YES), and in S50 or S51 (described below) displays the text object 54 in a selected state in the display field 71. As shown in a screen G11 of FIG. 9, the CPU 2 displays the text object 54 in the display field 71 in a third color, which is the color of the ink ribbon to be used with the tape 33. In the screen G11, the user checked the checkbox 80.

In S49 the CPU 2 determines whether the prohibited area P overlaps the text object 54. In this example of the screen G11, the CPU 2 determines that the prohibited area P overlaps the text object 54 (S49: YES) and in S50 displays the prohibited area P the warning mode, as illustrated in screen G11. In a case that the user cancels the selection of the added text object 54 in this state (S52: YES, S53: YES), in S54 the CPU 2 performs a nullification process to cancel the addition of the text object 54 and in S55 displays on the display 7 the screen G10 again that is displayed before the command to add the text object 54 was inputted.

Figure 9:
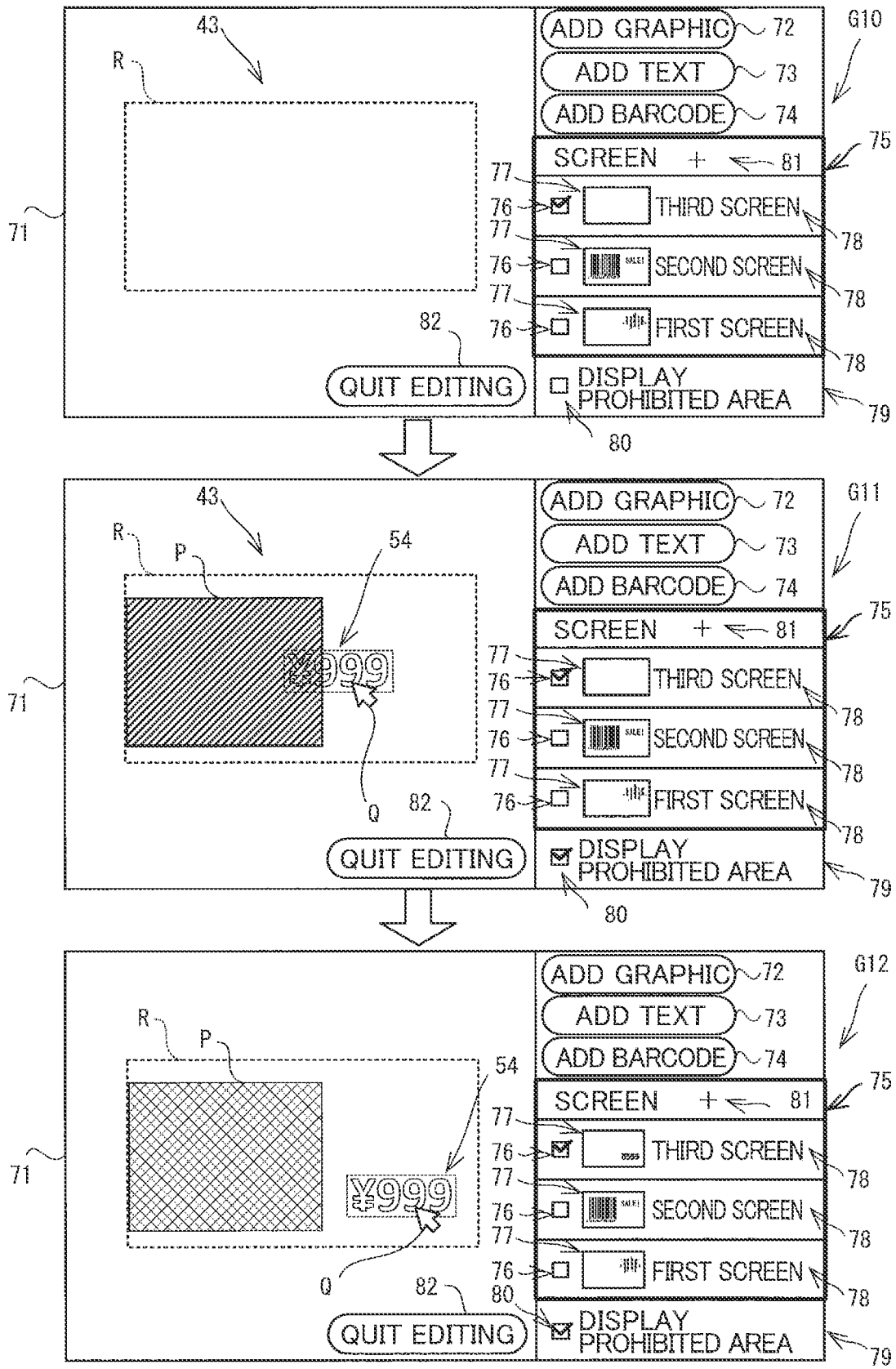
FIG. 9 is an explanatory diagram illustrating screens.
Figure 10:
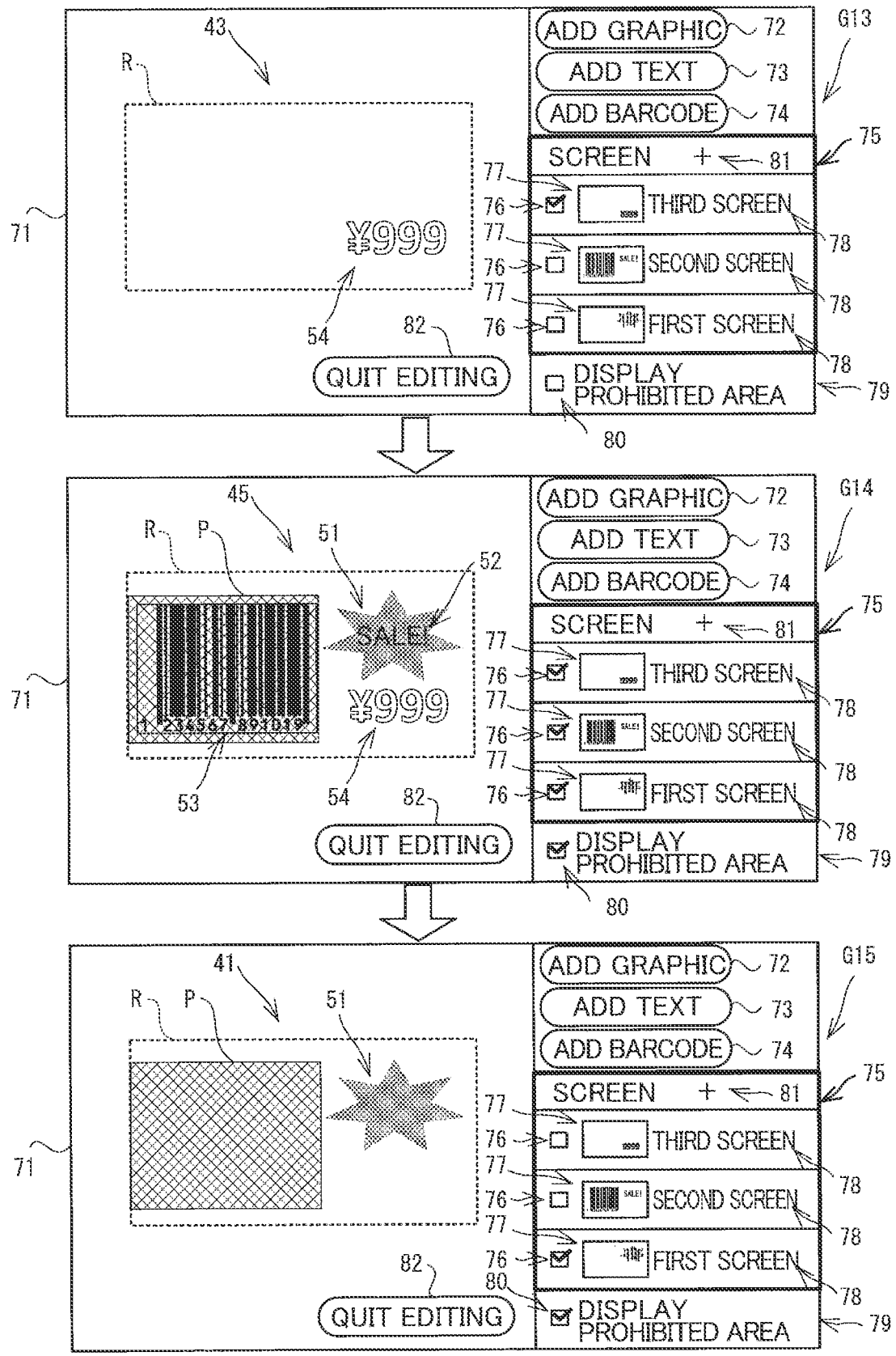
FIG. 10 is an explanatory diagram illustrating screens.

On the other hand, in a case that the user notices that the prohibited area P is displayed in the warning mode while referencing the display field 71, the user can operate the input interface 8 to move the text object 54 to a position at which the text object 54 does not overlap the prohibited area P, as illustrated in a screen G12 in FIG. 9. In a case that the user subsequently deselects the text object 54 (S48: YES. S49: NO), in S51 the CPU 2 displays the prohibited area P in the normal mode. Once the user has completed the addition and layout of the text object 54 (S52: YES) and as long as the text object 54 no longer overlaps the prohibited area P (S53: NO), in S56 the CPU 2 completely decides to add and layout the text object 54, and edits third print data to be used for printing the tape 33. In S57 the CPU 2 displays a screen CH shown in FIG. 10 on the display 7. Here, the example of the screen G13, the user removes the check in the checkbox 80.

While the screen G13 is displayed, in a case that the CPU 2 detects commands to input checks in the checkboxes 76 for the first and second screens and a command to add a check to the checkbox 80 (S20: YES), in S21 the CPU 2 displays a composite image 45 in the display field 71, as shown in a screen G14. The composite image 45 includes the image 41 of the first screen, the image 42 of the second screen, and the image 43 of the third screen superimposed in the overlay order in accordance with the overlay order of the tapes 31, 32, and 33 corresponding to the first, second, and third screens while displaying the prohibited area P laid out relative to the printing area R. Subsequently, the CPU 2 returns to S6.

In a case that the CPU 2 detects a command to remove the checks from the checkboxes 76 for the second and third screens while the screen G14 is displayed (S15: YES), in S16 the CPU 2 identifies the N to be 1, in S17 determines that the prohibited area P is set to be displayed (S17: YES), and in S18 displays the image 41 for the first screen in the display field 71, as shown in screen G15. The image 41 includes the prohibited area P laid out relative to the printing area R. Subsequently, the CPU 2 returns to S6.

In a case that the CPU 2 detects a quit command at this time (S24: YES), in S25 the CPU 2 executes a process to complete the editing process. Specifically, the CPU 2 generates print data that includes the first print data through third print data and outputs the generated print data. For example, the CPU 2 may transmit the generated print data to the printing device 10 via the communication interface. Alternatively, the CPU 2 may store the generated print data in the storage 5. This completes the editing process.

In the embodiment described above, the editing device 1, the display 7, the input interface 8, the CPU 2, the storage 5 are respectively examples of the editing device, the display, the input interface, the controller, and the storage. The process of S42 is an example of the first editing process and step. The processes of S18-S19, are an example of the first display process and step. The process of S56 is an example of the second editing process and step. The processes of S18-S19 are an example of the second display process and step. The process of S33 is an example of the settings process and step. The processes of S43 and S54 are an example of the nullification process and step. The process of S56 is an example of the third editing process. The processes of S18-S19 are an example of the third display process. The process of S1 is an example of the margin acquisition process and step. The process of S44 is an example of the area editing process. The process of S23 is an example of the modification process. The process of S20 is an example of the composite image display process. The process of S13 is an example of the label editing process.

With the editing device 1 according to the embodiment described above, in a case that the user adds the specific object 53 to the image 42 to be printed on the tape 32 (S31: YES), the CPU 2 sets the prohibited area P in the printing area R (S33). Accordingly, the user can edit the layout of an object to be printed on the tape 33 for the label 30 configured of a plurality of tapes 31-33 while accounting for the layout of the specific object 53 to be printed on the tape 32 so that the object to be printed on the tape 33 does not enter the prohibited area P. Hence, when editing first through third print data corresponding to the tapes 31-33 configuring the label 30, the editing device 1 can prevent the user from arranging an object for the tape 33, different from the specific object 53, in the prohibited area P of the printing area R.

The editing device 1 also performs a nullification process in S43 to nullify editing based on information inputted by the user via the input interface 8 in a case that a non-specific object 54 for the tape 33 (i.e., not the specific object 53 associated with the prohibited area P) is laid out in the prohibited area P, or in a case that a non-specific object for the tape 32 (different from the specific object 53 associated with the prohibited area P) is arranged in the prohibited area P. Thus, the editing device 1 can reliably prevent the user from arranging a non-specific object in the image 42, which includes the specific object 53, at a position overlapping the specific object 53.

Each of the tapes 31-33 is provided with the adhesive tape 24 having the film tape 26 on which an image is printed, and the adhesive layer 27 provided on one surface of the film tape 26; and the release paper 28 that is bonded to the surface of the film tape 26 by the adhesive layer 2T. The tape 33 is bonded to other side of the film tape 26 (i.e., the surface side opposite the adhesive layer 27 side) of the tape 32. When the user edits the first through third print data individually for the corresponding tapes 31-33 configuring the label 30, the editing device 1 can reliably prevent the tape 33 bonded to the printing surface side of the tape 32 from obscuring the specific object 53 included in the image 42 printed on the tape 32 so that the specific object 53 is not fully visible.

The editing device 1 also edits first print data for printing the image 41 on the tape 31 based on information inputted through the input interface 8. The tape 31 is a printing medium to be bonded to the tape 32 and has a printing area R set to the same size as the printing area R on the tape 32. The editing device 1 displays a component screen on the display 7 for editing the tape 31. The component screen displayed on the display 7 includes the image 41 laid out relative to the printing area R. In a case that the user arranges a non-specific object (i.e., an object different from the specific object 53) for the tape 31 (or the tape 33) so that the object enters the prohibited area P, the editing device 1 nullifies all editing based on the information inputted via the input interface 8 (S43, S54). Therefore, the editing device 1 facilitates the user in editing the layout of objects to be printed on the tape 31 (and tape 33) while accounting for the layout of the specific object 53 to be printed on the tape 32.

The specific object 53 in the embodiment is an object representing a linear barcode or a matrix barcode. Thus, when creating a label 30 by bonding together a plurality of tapes, the editing device 1 can avoid having objects other than the specific object representing a linear barcode or matrix barcode from overlapping this specific object and preventing the linear barcode or matrix barcode from not being read.

The editing device 1 acquires margin settings specifying the width of the margins around a specific object that includes a linear barcode or matrix barcode (S1) and sets the prohibited area P to an area expanded from the region in which the specific object is laid out by the specified margins (S33). Therefore, when a plurality of tapes edited by the editing device 1 is overlaid and bonded together, the editing device 1 can ensure that objects other than those representing a linear barcode or matrix barcode do not overlap an object representing a linear barcode or matrix barcode, even if the tapes 31-33 are slightly misaligned.

The editing device 1 edits the prohibited area P for the specific object 53 according to the process to edit the specific object (S44). Therefore, the editing device 1 can edit the prohibited area P to conform with any editing performed on the specific object 53. In this way, the editing device 1 eliminates the user's time and effort required for modifying the prohibited area P to match editing performed on the specific object.

In a prescribed case that the specific object 53 has been laid out in the second screen and the prohibited area P has been set relative to the printing area R (S17: YES), the editing device 1 displays on the display 7 the first screen or third screen including (or showing) the layout of the image of the screen relative to the printing area R. and the layout of the prohibited area P relative to the printing area R (S18).

Accordingly, the user can determine the layout of the prohibited area P relative to the printing area R by referencing the display 7, even when editing print data based on the first screen or third screen. This method makes editing of print data more convenient to the user than a conceivable configuration that does not display the layout of the prohibited area P relative to the printing area R.

In a prescribed case that the second screen is displayed on the display 7, the specific object 53 is laid out in the second screen, and the prohibited area P has been set relative to the printing area R (S17: YES), the editing device 1 displays the second screen including (or showing) the layout of the image relative to the printing area R and the layout of the prohibited area P relative to the printing area R. This method facilitates the user in verifying the range of the prohibited area P relative to the printing area R better than a conceivable configuration that does not display the outline of the prohibited area P.

The layout of the prohibited area P relative to the printing area R is represented by an outline of the prohibited area P. This method of displaying the prohibited area P facilitates the user in confirming the range of the prohibited area P relative to the printing area R better than a conceivable configuration that does not display the outline of the prohibited area P.

In a case that the editing device 1 determines that a prescribed operation was performed based on information inputted via the input interface 8 (S34: YES, S48: YES), the editing device 1 can display a component screen on the display 7 that includes (or shows) the layout of the image relative to the printing area R and the layout of the prohibited area P relative to the printing area R (S36, S37, S50, S51). Thus, the editing device 1 can display the layout of the prohibited area P relative to the printing area R on the display 7 when the user performs a prescribed operation using the input interface 8. With this method, the editing device 1 facilitates the user in confirming an image relative to the printing area R better than a conceivable configuration in which the prohibited area P is always displayed in the display 7.

The editing process performed by the editing device 1 includes cases in which the specific object 53 is selected and cases in which the specific object 53 is not selected. In a case that the specific object is selected (S34: YES), the editing device 1 displays the layout of the prohibited area P relative to the printing area R on the display 7 (S36, S37). In a case that the specific object 53 is not selected (S34: NO), the editing device 1 can stop displaying the layout of the prohibited area P relative to the printing area R.

The editing device 1 displays the prohibited area P in a different format depending on the positional relationship between the prohibited area P and the other object (S36 and S37, S50 and S51). From the different displayed formats of the prohibited area P, the user can easily recognize the positional relationship between the prohibited area P and the other object. This display method can prevent the user from inputting a command to lay out a non-specific object in the prohibited area P.

The outline of the prohibited area P is used to represent the layout of the prohibited area. P relative to the printing area R. The editing device 1 reduces or enlarges the prohibited area P in response to commands inputted via the input interface 8 to modify the shape of the outline (S23). This method is more convenient for a user editing print data than a conceivable configuration in which the editing device 1 does not allow the size of the prohibited area P to be modified.

The editing device 1 displays the screen (composite screen) G14 (FIG. 10) that includes (or shows) the layout of the images 41-43 relative to the printing area R on the display 7 according to the overlaying order of the tapes 31-33 (S21). The editing device 1 edits print data based on information inputted via the input interface 8 (S13). Thus, prior to executing a printing operation based on the print data, the user can confirm on the display 7 how the images representing the label 30 will appear when the label 30 is created by bonding together the plurality of tapes 31-33 printed based on the edited print data. While referencing the composite image 45, the user can input editing commands via the input interface 8 to edit the overall image of the label on the editing device 1. In this way; the editing device 1 can facilitate the user in editing print data for a label better than a conceivable device that only allows the user to edit print data for each tape individually.

While the disclosure has been described in detail with reference to the specific embodiment thereof, it would be apparent to those skilled in the art that various changes and modifications may be made therein without departing from the scope of the invention.

(A) The structure of the editing device 1 may be modified as appropriate. For example, the editing device 1 may be a standalone device or may be provided in the printing device 10. The structures of the display 7, the input interface 8, and the storage 5 provided in the editing device 1 may also be suitably modified. The editing device 1 may not be provided with either one of the display 7 and the input interface 8. In a case that the display 7 is not provided in the editing device 1, for example, the N-th screen may be displayed on a display device connected to the editing device 1 by a cable or wirelessly. In a case that the editing device 1 is not provided with the input interface 8, for example, the editing device 1 may acquire various commands via an input device connected to the editing device 1 by a cable or wirelessly.

The order in which the first through third tapes are bonded may be modified as needed. At least one of the first through third tapes need not include release paper.

Figure 11:
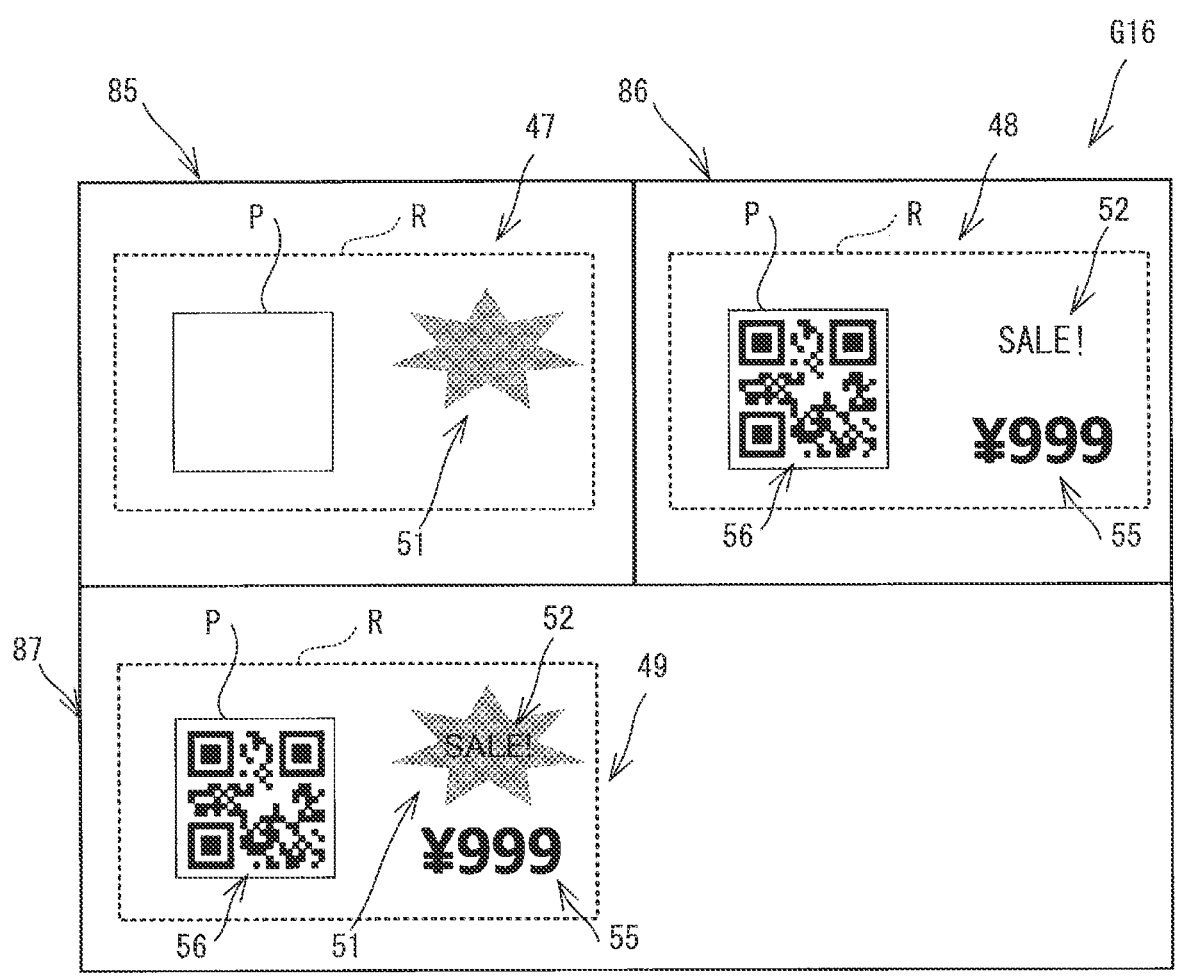
FIG. 11 is an explanatory diagram illustrating a screen according to a modification.

The layout and the like of the screens used to edit print data may be modified as needed. For example, a screen for editing print data may be configured like a screen (116 shown in FIG. 11. As shown in FIG. 11, the screen G16 includes display fields 85, 86, and 87. The display field 85 displays a component screen (the first screen) for the first tape showing a first image 47 in relation to the printing area R. The first image 47 includes the graphic object 51. The display field 86 displays a component screen (the second screen) for the second tape showing a second image 48 in relation to the printing area R. The second image 48 includes text objects 52 and 55, and a matrix barcode object 56. The display field 87 displays a screen (composite screen) for an image 49 relative to the printing area R when the first tape and the second tape are superimposed. If needed, the screen G16 may also be provided with buttons for editing the images. In the variation of FIG. 11, the editing device 1 may set a prohibited area P for the matrix barcode object 56 serving as the specific object.

(B) A program that includes instructions for executing a process on the editing device 1 may be stored in a storage of the editing device until components (the CPU 2, for example) in the editing device 1 executes the program. Hence, the method of acquiring the program, the acquisition path, and the device or component storing the program may each be modified as needed. The program executed by the editing device 1 may be received from another device via a cable or wireless communications and stored in a storage device such as flash memory. The other device may be a PC, or a server connected to the editing device 1 via a network, for example.

(C) In the embodiment, steps in the editing process are executed by the CPU of the editing device 1, but some or all of these steps may be executed by another electronic device, such as an application-specific integrated circuit (ASIC). Alternatively, steps may be executed through distributed processing performed by a plurality of electronic devices, such as a plurality of CPUs. If necessary, steps in the process performed on the editing device 1 may be omitted, other steps may be added, and the order of steps may be modified. The scope of this specification includes a mode in which an operating system (OS) or the like operating on the editing device 1 performs some or all of the processes based on commands from a control unit in the editing device 1. As an example, the process of the editing device 1 may have the following modifications.

The editing device 1 may be capable of editing print data for creating a label by bonding together two or more tapes in a specific order. In a case that editing first print data for printing a first image on a first tape and the first image includes a specific object, the editing device 1 need not set a prohibited area in the printing area of the first tape and need not execute a nullification process for the first image. The specific object may be an object representing a linear barcode or matrix barcode and may be an object prerecorded on the editing device 1 or a user-specified object. The editing device 1 also need not set margins around the specific object. The editing device 1 may further set margins inside the outline of the specific object. For example, in a case that the specific object is an object representing a linear barcode or matrix barcode, the editing device 1 may allow margins to be set inside the outline of the specific object within a range that does not hinder reading of the linear barcode or matrix barcode. Further, the editing device 1 need not edit the prohibited area corresponding to the specific object according to the process to edit the specific object. For certain cases in which a prohibited area has been set relative to the printing area, the editing device 1 need not display the layout of the prohibited area relative to the printing area on the display 7. The method of setting an option for displaying a prohibited area relative to the printing area may be modified as needed, and the editing device 1 may be configured to prohibit the user from setting this option.

As an alternative to the outline of the prohibited area, the layout of the prohibited area relative to the printing area may be a partial graphic representing the outline, such as the four corners of a rectangle. The layout of the prohibited area relative, to the printing area may always be displayed in the display 7 during the editing process. The layout of the prohibited area relative to the printing area may be displayed in the same format regardless of the positional relationship between the prohibited area and other objects. To display the layout of the prohibited area relative to the printing area in different formats according to the positional relationship of the prohibited area and other objects, the editing device 1 may change the colors of the outline and the fill, change the line type of the outline (e.g., using a thicker line or a double line) or change the interval of a flashing display of the layout of the prohibited area as needed. The editing device 1 need not perform a modification process to reduce or enlarge the prohibited area in response to a command to change the shape of the outline. Additionally, the process in S20 and S21 may be omitted. The editing device 1 may also omit the process in S22 and S23. Further, the overlay order for a tape having a specific object may be modified as needed.

Instead of film tape, the base material of the tape may be washi (Japanese paper) or the like that is sufficiently transparent to see through the tape in the thickness direction. The base material of a tape whose adhesive layer is not bonded to another tape (the tape 31 in the example of FIG. 2) need not be transparent or translucent.

What is claimed is:

1. An editing device comprising:
    a controller; and
    a storage storing a program that, when executed by the controller, causes the controller to execute:
        a first editing process to edit first print data based on first information inputted via an input interface, the first print data defining a printing area and representing a first image in the printing area, the first image being to be printed on a first tape, the first tape being a printing medium having a contiguous length;
        a first display process to display a first screen used for the first editing process on a display, the first screen showing a layout of the first image relative to the printing area;
        a second editing process to edit second print data based on second information inputted via the input interface, the second print data defining the printing area and representing a second image in the printing area, the second image being to be printed on a second tape, the second tape being a printing medium having a contiguous length and to be bonded to the first tape;
        a second display process to display a second screen used for the second editing process on the display, the second screen showing layout of the second image relative to the printing area;
        a settings process to set a prohibited area in the printing area in a case that a specific object is added to the first image in the first editing process, the prohibited area being for prohibiting an object different from the specific object from being arranged therein, the prohibiting area being set according to the specific object; and
        a nullification process to nullify editing based on the second information executed in the second editing process in a case that that an object different from the specific object is arranged in the prohibiting area in the second editing process,
    wherein the first tape includes:
        a first adhesive tape including a first base material sheet on which the edited first image is printed and a first adhesive layer, the first base material sheet having one surface and an opposite surface opposite the one surface, the first adhesive layer being formed on the one surface of the first base material sheet; and
        a first release paper bonded to the one surface of the first base material sheet via the first adhesive layer,
    wherein the second tape includes:
        a second adhesive tape including a second base material sheet on which the edited second image is printed and a second adhesive layer, the second base material sheet having one surface and an opposite surface opposite the one surface, the second adhesive layer being formed on the one surface of the second base material sheet; and
        a second release paper bonded to the one surface of the second base material sheet via the second adhesive layer,
    wherein the second tape is to be bonded to the opposite surface of the first base material sheet.

2. The editing device according to claim 1, wherein in a case that an object different from the specific object is arranged in the prohibiting area in the first editing process, the nullification process nullifies editing based on the first information.

3. The editing device according to claim 1, wherein the program that, when executed by the controller, causes the controller to further execute:
    a third editing process to edit third print data based on third information inputted via the input interface, the third print data defining the printing area and representing a third image in the printing area, the third image being to be printed on a third tape, the third tape being a printing medium having a contiguous length and to be bonded to one of the first tape and the second tape; and
    a third display process to display a third screen used for the third editing process on the display, the third screen showing a layout of a third image relative to the printing area,
    wherein in a case that an object different from the specific object is arranged in the prohibiting area in the third editing process, the nullification process nullifies editing based on the third information.

4. The editing device according to claim 1, the specific object represents either one of a one-dimensional barcode and a two-dimensional barcode.

5. The editing device according to claim 1, wherein the program that, when executed by the controller, causes the controller to further execute:
    an acquisition process to acquire information on a margin to be set around the specific object,
    wherein the settings process sets the prohibited area to an area expanded from an area in which the specific object is laid out by the margin.

6. The editing device according to claim 1, wherein the program that, when executed by the controller, causes the controller to further execute:
    an area editing process to edit, in a case that the specific object is edited, the prohibited area in accordance with the specific object being edited.

7. The editing device according to claim 1, wherein in a prescribed case that the prohibited area is set relative to the printing area, the second display process displays on the display the second screen showing the layout of the second image relative to the printing area and a layout of the prohibiting area relative to the printing area.

8. The editing device according to claim 7, wherein in the prescribed case, the first display process displays on the display the first screen showing the layout of the first image relative to the printing area and a layout of the prohibiting area relative to the printing area.

9. The editing device according to claim 7, wherein the layout of the prohibited area relative to the printing area is represented by an outline of the prohibited area.

10. The editing device according to claim 7, wherein the prescribed case includes a case that the prohibited area is set relative to the printing area and it is determined based on information inputted via the input interface that a prescribed operation is performed.

11. The editing device according to claim 7, wherein the prescribed case includes a case that the prohibited area is set relative to the printing area and the specific object is currently selected.

12. The editing device according to claim 7, wherein the layout of the prohibited area relative to the printing area is represented in different formats for different positional relations between the prohibited area and the object different from the specific object.

13. The editing device according to claim 7, wherein the layout of the prohibited area relative to the printing area is represented by an outline of the prohibited area,
wherein the program that, when executed by the controller, causes the controller to further execute:
a modification process to enlarge or reduce the prohibited area according to an instruction to modify a shape of the outline of the prohibited area by the input interface.

14. The editing device according to claim 1, wherein the program that, when executed by the controller, causes the controller to further execute:
a composite image display process to display a composite image in which the first image and the second image are overlapped in an order in accordance with an overlaying order of the first tape and the second tape; and
a label editing process to edit both the first print data and the second print data based on information inputted via the input interface.

15. A method comprising:
a first editing step to edit first print data based on first information inputted via an input interface, the first print data defining a printing area and representing a first image in the printing area, the first image being to be printed on a first tape, the first tape being a printing medium having a contiguous length;
a first display step to display a first screen used for the first editing step on a display, the first screen showing a layout of the first image relative to the printing area;
a second editing step to edit second print data based on second information inputted via the input interface, the second print data defining the printing area and representing a second image in the printing area, the second image being to be printed on a second tape, the second tape being a printing medium having a contiguous length and to be bonded to the first tape;
a second display step to display a second screen used for the second editing step on the display, the second screen showing layout of the second image relative to the printing area;
a settings step to set a prohibited area in the printing area in a case that a specific object is added to the first image in the first editing step, the prohibited area being for prohibiting an object different from the specific object from being arranged therein, the prohibiting area being set according to the specific object; and
a nullification step to nullify editing based on the second information executed in the second editing step in a case that that an object different from the specific object is arranged in the prohibiting area in the second editing step,
wherein the first tape includes:
a first adhesive tape including a first base material sheet on which the edited first image is printed and a first adhesive layer, the first base material sheet having one surface and an opposite surface opposite the one surface, the first adhesive layer being formed on the one surface of the first base material sheet; and
a first release paper bonded to the one surface of the first base material sheet via the first adhesive layer,
wherein the second tape includes:
a second adhesive tape including a second base material sheet on which the edited second image is printed and a second adhesive layer, the second base material sheet having one surface and an opposite surface opposite the one surface, the second adhesive layer being formed on the one surface of the second base material sheet; and
a second release paper bonded to the one surface of the second base material sheet via the second adhesive layer,
wherein the second tape is to be bonded to the opposite surface of the first base material sheet.

16. A non-transitory computer readable storage medium storing a set of program instructions installed on and executed by a computer for controlling an editing device, the set of program instructions comprising:
executing a first editing process to edit first print data based on first information inputted via an input interface, the first print data defining a printing area and representing a first image in the printing area, the first image being to be printed on a first tape, the first tape being a printing medium having a contiguous length;
executing a first display process to display a first screen used for the first editing process on a display, the first screen showing a layout of the first image relative to the printing area;
executing a second editing process to edit second print data based on second information inputted via the input interface, the second print data defining the printing area and representing a second image in the printing area, the second image being to be printed on a second tape, the second tape being a printing medium having a contiguous length and to be bonded to the first tape;
executing a second display process to display a second screen used for the second editing process on the display, the second screen showing layout of the second image relative to the printing area;
executing a settings process to set a prohibited area in the printing area in a case that a specific object is added to the first image in the first editing process, the prohibited area being for prohibiting an object different from the specific object from being arranged therein, the prohibiting area being set according to the specific object; and
executing a nullification process to nullify editing based on the second information executed in the second editing process in a case that that an object different from the specific object is arranged in the prohibiting area in the second editing process,
wherein the first tape includes:
a first adhesive tape including a first base material sheet on which the edited first image is printed and a first adhesive layer, the first base material sheet having one surface and an opposite surface opposite the one surface, the first adhesive layer being formed on the one surface of the first base material sheet; and
a first release paper bonded to the one surface of the first base material sheet via the first adhesive layer,
wherein the second tape includes:
a second adhesive tape including a second base material sheet on which the edited second image is printed and a second adhesive layer, the second base material sheet having one surface and an opposite surface opposite the one surface, the second adhesive layer being formed on the one surface of the second base material sheet; and a second release paper bonded to the one surface of the second base material sheet via the second adhesive layer,
wherein the second tape is to be bonded to the opposite surface of the first base material sheet.

\* \* \* \* \*

UNITED STATES PATENT AND TRADEMARK OFFICE
CERTIFICATE OF CORRECTION

PATENT NO. : 11,413,880 B2
APPLICATION NO. : 17/157988
DATED : August 16, 2022
INVENTOR(S) : Yusuke Miyajima It is certified that error appears in the above-identified patent and that said Letters Patent is hereby corrected as shown below:

On the Title Page

1) Item (57) ABSTRACT, Line 13, is corrected to delete the term "that" immediately before the phrase "that an object different from the specific object is"

In the Specification

2) Column 2, Line 9, is corrected to delete the term "that" immediately before the phrase "that an object different from the"

3) Column 2, Line 38, is corrected to delete the term "that" immediately before the phrase "that an object different from the"

4) Column 3, Line 5, is corrected to delete the term "that" immediately before the phrase "that an object different from the specific object is"

In the Claims

5) Column 19, Line 44, in Claim 1, is corrected to delete the term "that" immediately before the phrase "that an object different from the"

6) Column 21, Line 56, in Claim 15, is corrected to delete the term "that" immediately before the phrase "that an object different from the specific object"

7) Column 22, Line 48, in Claim 16, is corrected to delete the term "that" immediately before the phrase "that an object different"

Signed and Sealed this
Tenth Day of October, 2023

Katherine Kelly Vidal
*Director of the United States Patent and Trademark Office*